Oct. 21, 1941.   M. SPARLING   2,259,783
COLLAPSIBLE HOUSE TRAILER
Filed Jan. 23, 1939   2 Sheets-Sheet 1
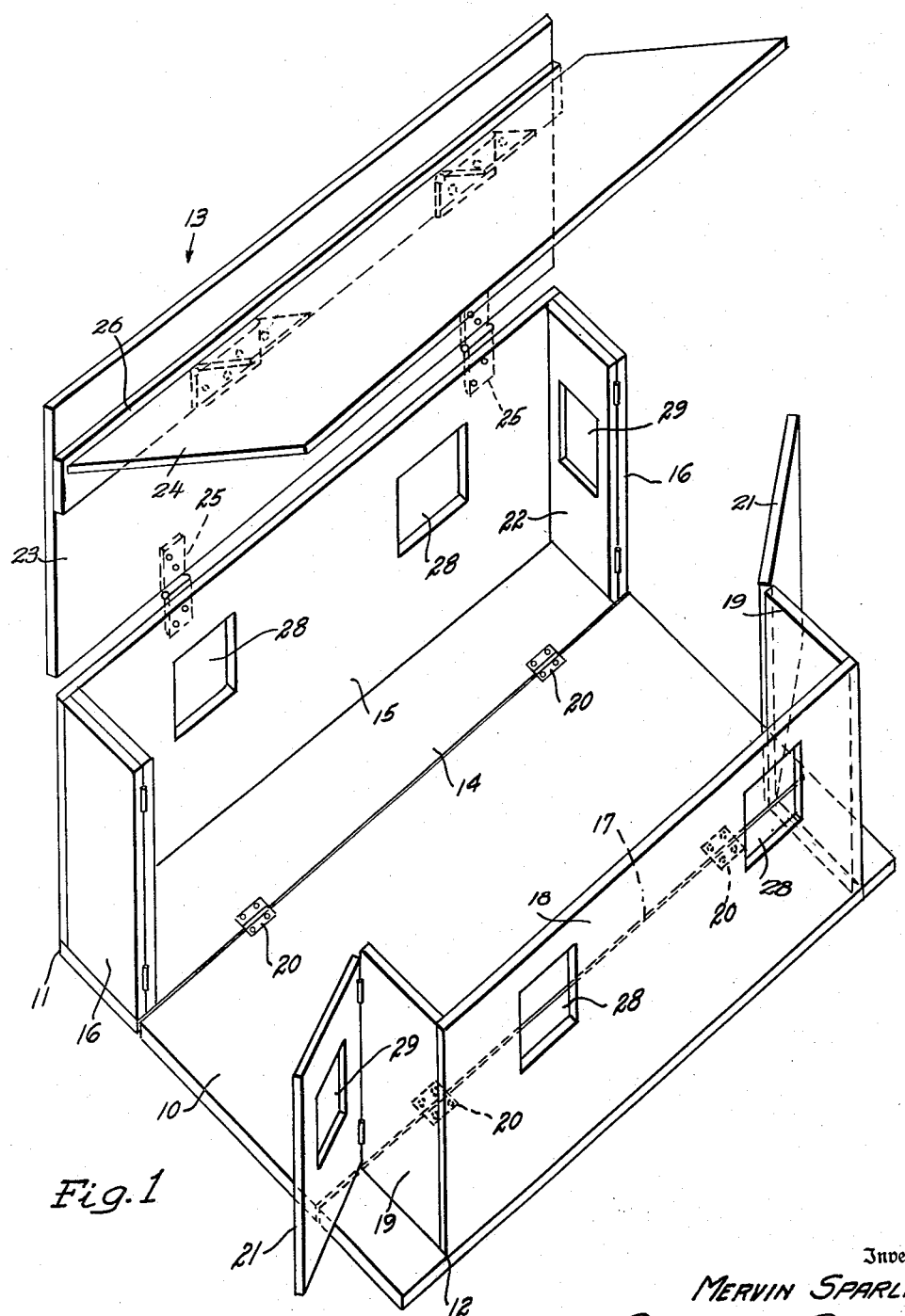
Fig.1
Inventor
MERVIN SPARLING.
By
Attorneys Oct. 21, 1941.　　　M. SPARLING　　　2,259,783
COLLAPSIBLE HOUSE TRAILER
Filed Jan. 23, 1939　　　2 Sheets-Sheet 2

Inventor
MERVIN SPARLING.
By
Attorneys

Patented Oct. 21, 1941

2,259,783

UNITED STATES PATENT OFFICE 2,259,783

COLLAPSIBLE HOUSE TRAILER

Mervin Sparling, St. Clair, Mich.

Application January 23, 1939, Serial No. 252,325

5 Claims. (Cl. 20—2)

This invention relates generally to houses and more particularly to collapsible or foldable houses.

One of the objects of the present invention is to provide a new and improved foldable house which in its folded state has a width within legal limits required of trailers or house cars but which is so folded as to provide maximum floor space when unfolded or set up for use.

This and other objects of the invention will become apparent from the following description taken in connection with the accompanying drawings in which—

Figure 1 is a perspective view of my improved foldable house shown partly unfolded with the roof lifted up;

Figure 2:
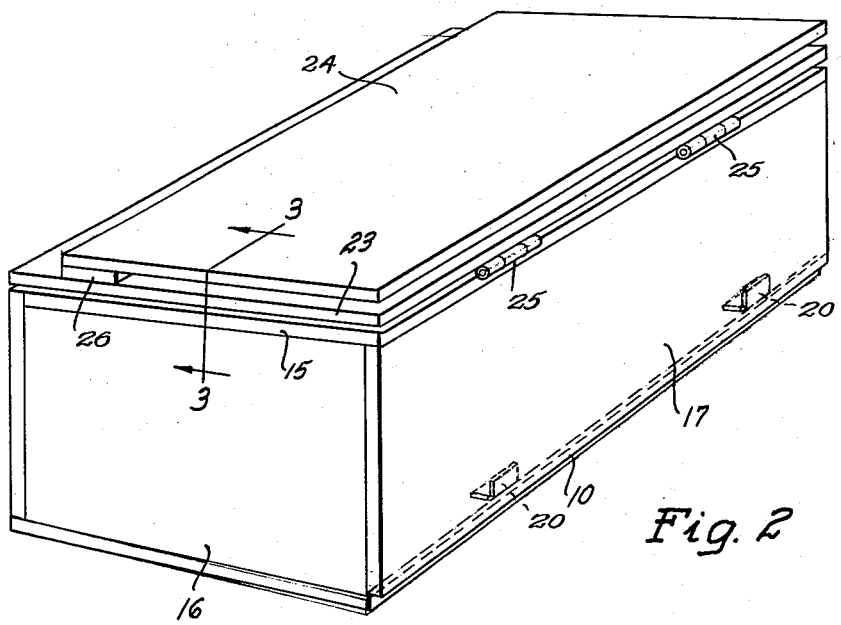
Fig. 2 is a perspective view of the house shown folded and ready for transport.
Figure 3:
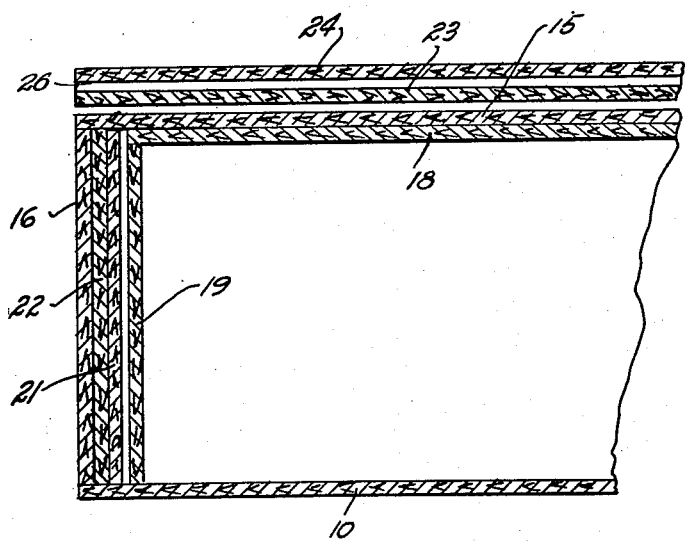
Fig. 3 is a view shown in section taken along the line 3—3 of Fig. 2.

Referring to the drawings by characters of reference, my improved folding house is formed by four general sections comprising a central floor section 10, a pair of oppositely disposed sections 11 and 12 and a roof section 13. As shown in Fig. 1, the section 11 comprises a floor portion 14, a side wall 15 and oppositely disposed end wall portions 16 which may be integral or rigidly secured together by any suitable means. Similarly, the other section 12 comprises a floor portion 17, a side wall 18 and end wall portions 19 rigidly secured together. The central floor section 10 and the sections 11 and 12 are hinged together by spaced hinges 20 which connect the floor portions 14 and 17 to opposite side edges of the central floor section 10. The heights of the side and end wall portions of sections 11 and 12 are substantially equal to the width of the central floor section 10.

In order to provide a folding house which in its folded state may be transported along highways within the laws governing the widths of trailer vehicles and which when unfolded provide maximum floor space, the width of the central floor section is made equal to the maximum width permitted for road vehicles and section 12 is adapted to telescope or fit within section 11 when the house is folded. When the house is unfolded, the floor portions 14 and 17 lie flush with the central floor section 10 thus adding to or providing increased floor space. Doors 21 may be hinged to the end wall portions 19 and sliding doors 22 suitably guided may be provided to cooperate with the swinging doors and with the end wall portions 19 to form the end walls of the house. The sliding doors 22 are arranged to slide back of the end wall portion 16 and by swinging the hinged doors 21 outwardly against the outer wall surface of end wall portions 19, the sections 11 and 12 may be folded inwardly over the central floor section 10. When this is done, the swinging doors 21 position between and adjacent the inner wall surfaces of the sliding doors 22.

The top or roof section 13 comprises two hinged together sections 23 and 24 of which section 23 is hinged at one edge, as at 25, to the upper edge of the side wall 15. A strip 26 is secured to the underside of roof section 23, spaced from and extending parallel to the inner edge thereof, and roof section 24 is connected to the strip 26 in such manner as to provide an overlapping joint between the hinged roof sections to shed water. It will be seen that when the house is folded, roof section 24 is folded down against the underside of roof section 23 and then together the sections are swung outward to lie against the outer surface of the side wall 15. In the side walls 15 and 18 windows 28 may be provided and if desired other windows 29 may be provided in the end walls and doors. It will be seen that when the house is folded all of the windows will be covered and thus protected against damage in transporting the house.

When it is desired to unfold or set up the house, it is only necessary to swing the sections 11 and 12 outwardly and unfold the roof and swing it into place over the upstanding side and end walls of the house, after which, of course, the doors 21 and 22 may be closed to complete the end walls of the house. When folding the house, section 12 telescopes or fits into the opposite section 11, both sections overlying the central floor section 10 and then the roof 13 is folded back against the side wall 15. This makes a compact folded house which may be transported as a trailer but which gives increased floor space over trailers when unfolded or set up for use.

While I have shown and described my invention in detail it is to be understood that the same is to be limited only by the appended claims for many changes may be made without departing from the spirit and scope of the invention.

What I claim is:

1. In a folding house, a central floor section outer floor sections hinged to opposite edges of said central floor section and arranged to lie in the same plane as the plane of said central section, side walls respectively mounted on and secured to the outer floor sections adjacent the outer edges thereof, oppositely disposed end wall portions mounted on each of said outer floor sections, said end wall portions being secured to respective outer floor sections and to adjacent side walls, the side wall and end wall portions mounted on one of said outer floor sections being arranged to telescope into the space within the confines of the side wall and end wall portions mounted on the other of said outer floor sections and overlie said central floor section.

2. In a folding house, a central floor section, outer sections hinged to opposite longitudinal edges of said central floor section, each of said outer sections comprising a floor portion and an upstanding side wall and opposite end wall portions rigidly secured together, the height of the side walls and the end wall portions being substantially equal to the width of said central floor section, said outer sections being arranged to swing inwardly and telescope over said central floor section, doors carried by both of said outer sections and arranged to fold within the walls of the house when the house is folded, and a folding roof carried by one of said outer sections.

3. A housing comprising four main sections foldable into a box-like structure including a central floor section constituting the bottom of the box-like structure, a pair of outer floor sections hinged to said central section, said outer floor sections lying in substantially the same plane as said central section when the structure is unfolded and providing upright opposite side walls when the structure is folded, a side wall integral with each of said outer floor sections, a pair of end walls associated with one of said outer floor sections and with the corresponding side wall, and a second pair of end walls associated with the other of said outer floor sections and with the corresponding side wall, the end walls of one of said pairs being positioned closer together than the end walls of the other of said pair so as to position therebetween with one side wall overlying the other when the structure is folded.

4. A house comprising four main sections foldable into a box-like structure including a central floor section constituting the bottom of the box-like structure, a pair of outer floor sections hinged to said central section, said outer floor sections lying in substantially the same plane as said central section when the structure is unfolded and providing upright opposite side walls when the structure is folded, a side wall integral with each of said outer floor sections, a pair of end walls associated with one of said outer floor sections and with the corresponding side wall, a second pair of end walls associated with the other of said outer floor sections and with the corresponding side wall, the end walls of one of said pairs being positioned closer together than the end walls of the other of said pair so as to position therebetween with one side wall overlying the other when the structure is folded, and doors carried by said end walls.

5. A house comprising four main sections foldable into a box-like structure including a central floor section constituting the bottom of the box-like structure, a pair of outer floor sections hinged to said central section, said outer floor sections lying in substantially the same plane as said central section when the structure is unfolded and providing upright opposite side walls when the structure is folded, a side wall integral with each of said outer floor sections, a pair of end walls associated with one of said outer floor sections and with the corresponding side wall, a second pair of end walls associated with the other of said outer floor sections and with the corresponding side wall, the end walls of one of said pairs being positioned closer together than the end walls of the other of said pair so as to position therebetween with one side wall overlying the other when the structure is folded, doors carried by said end walls, hinged-together foldable roof sections atttached solely to one of said side walls, and hinge means hinging one of said roof sections to one of said side walls, said roof being foldable to rest on one of said side walls when the structure is folded in box-like form.

MERVIN SPARLING.